United States Patent [19]

Matsumoto et al.

[11] Patent Number: 5,170,220
[45] Date of Patent: Dec. 8, 1992

[54] METHOD OF REGULATING OPTICAL AXES OF HEADLIGHTS FOR AUTOMOTIVE VEHICLE

[75] Inventors: Kuniaki Matsumoto, Kanagawa; Osamu Takao, Hiroshima, both of Japan

[73] Assignees: Nissan Motor Co., Ltd.; Chuo Electric Measurement Co., Ltd., both of Japan

[21] Appl. No.: 700,693

[22] Filed: May 16, 1991

[30] Foreign Application Priority Data

May 21, 1990 [JP] Japan .................. 2-131038

[51] Int. Cl.⁵ .................. G01J 1/00; G06K 9/38
[52] U.S. Cl. .................. 356/121; 382/51; 356/154
[58] Field of Search .............. 356/121, 122, 153, 154; 382/54, 51

[56] References Cited

U.S. PATENT DOCUMENTS

| 3,805,239 | 4/1974 | Watanabe | 382/51 |
| 4,634,275 | 1/1987 | Yoshida et al. | 356/121 |
| 4,647,195 | 3/1987 | Ishikawa et al. | 356/121 |
| 4,675,909 | 6/1987 | Egami et al. | 382/51 |
| 4,747,157 | 5/1988 | Kurakake et al. | 382/54 |
| 4,907,877 | 3/1990 | Fukuda et al. | 356/121 |

FOREIGN PATENT DOCUMENTS 63-113339  5/1988  Japan .

Primary Examiner—Richard A. Rosenberger
Assistant Examiner—Hoa Q. Pham
Attorney, Agent, or Firm—Lowe, Price, LeBlanc & Becker

[57] ABSTRACT

In a method of regulating optical axes of headlights for an automotive vehicle so that a light intensity boundary of low beam of headlights lies within a predetermined range displayed on a monitor TV, light intensity boundary points are detected along vertical lines arranged at predetermined picture element intervals in the horizontal direction; the detected boundary points are connected to determine a light intensity boundary line composed of horizontal and inclined lines; and the optical axes of the headlights are so regulated that the determined light intensity boundary line lies within the predetermined range on the monitor TV, thus enabling the headlight regulating work to be effected automatically for each vehicle at high speed and high reliability.

6 Claims, 6 Drawing Sheets

CL : CUT LINE
CL1 : HORIZONTAL CUT LINE
CL2 : INCLINED CUT LINE

METHOD OF REGULATING OPTICAL AXES OF HEADLIGHTS FOR AUTOMOTIVE VEHICLE

BACKGROUND OF THE INVENTION

1. Field of the Invention

The present invention relates to a method of regulating optical axes of two headlights for an automotive vehicle, and more specifically to a method of regulating optical axes of low beam of the headlights.

2. Description of the Prior Art

In an automotive vehicle assembly line, there is required a process of regulating optical axes of two headlights so that the light intensity boundary line (referred to as cut line) of the low beam thereof lies within a predetermined standard range, by projecting the low beam of the headlights on a frontward screen after the headlight has been assembled.

FIG. 1 shows an example of a light intensity distribution pattern of the low beam of headlights projected on a frontward screen, in which L denotes equi-illumination intensity lines; M denotes the maximum illumination intensity point; and K denotes a standard range of the light intensity distribution pattern, by way of example. Therefore, the optical axes of the headlights are regulated so that the cut line C (composed of a horizontal cut line $C_1$ and an oblique cut line $C_2$) indicative of boundary between a bright area a and a dark area b lies within the standard range K, as depicted in FIG. 1.

So far, since the above-mentioned optical axis regulating work for headlights has-been conducted by visual inspection, there exists a problem in that the regulation precision cannot be improved beyond a limit and further the worker's eye tends to become fatigued. To overcome this problem, recently, a method of regulating the optical axes has been proposed such that the headlight low beam is projected on a screen; the projected low beam is image detected by video cameras; detected video signals are image processed and displayed on a monitor TV to display a light distribution pattern including the light intensity boundary line (the cut line); and the optical axes are regulated so that the displayed cut line lies within a standard range on the monitor TV.

In more detail, in the case of a method disclosed in Japanese Published Unexamined (Kokai) Patent Appli. No. 63-113339, for instance, a light intensity distribution pattern of the low beam of headlights is formed on a screen disposed in front of the vehicle; a gravity center of equiillumination intensity closed-curves of a low beam having brightness beyond a predetermined value is calculated by an image processing apparatus; the image of the distribution pattern is differentiated in a vertical direction along a line passing through the gravity center; a light intensity boundary point in the vertical direction is determined on the basis of the differentiated values; the cut line is detected by binarization of the image signals, with the brightness of the light intensity boundary point as threshold; a relative distance between the gravity center and a point of intersection between the horizontal and oblique cut lines is previously obtained; a phantom cut line is determined on the basis of the gravity center and the relative distance; and the phantom line is checked as to whether lying within a standard range.

In the prior-art method as described above, however, since the cut line (light intensity boundary line) is detected by binarization of the -image signals, with the brightness of only the single light intensity boundary point as threshold, there exists a problem in that the light intensity boundary point is not determined accurately due to noise and therefore the cut line is not detected correctly, so that error is inevitably produced in the optical axis regulation. In addition, although the cut line is detected on the basis of the actual image signals at the first regulating work, since the cut line is determined on the basis of a phantom line obtained by the gravity center and the relative distance at the second and after regulating work, when sufficient image sensing conditions are not satisfied at the first work, there exists a problem in that the cut line (the light intensity boundary line) will not be detected correctly.

SUMMARY OF THE INVENTION

With these problems in mind, therefore, it is the primary object of the present invention to provide a method of regulating optical axes of two headlights for an automotive vehicle which can detect the light intensity boundary line at high speed and high reliability.

To achieve the above-mentioned object, the present invention provides a method of regulating optical axes of headlights for an automotive vehicle so that a light intensity boundary of headlight low beam lies within a predetermined range, comprising the steps of: (a) projecting the headlight low beam on the screen; (b) detecting headlight intensity on the screen; (c) calculating a sum total (T) in detected light intensity of a datum picture element (A) and some adjoining picture elements; (d) repeatedly calculating the sum totals (T) in detected light intensity along a vertical line (L); (e) calculating a difference (66 T) in light intensity sum total between two adjoining datum picture elements along the vertical line; (f) comparing the calculated difference in light intensity sum total with a predetermined value; (g) if the calculated difference exceeds the predetermined value, determining the higher light intensity datum picture element as a light intensity boundary point (CP); (h) repeating the above steps from (b) to (g) along other vertical lines arranged at predetermined picture element intervals along horizontal direction; and (i) connecting the calculated light intensity boundary points (CP) to determine the light intensity boundary line (CL). The calculated light intensity boundary line (CL) is composed of a horizontal low beam boundary line ($CL_1$) and an inclined low beam boundary line ($CL_2$) connected to the horizontal boundary line. The sum total in light intensity is repeatedly calculated along each of a plurality of vertical lines ($L_1$, $L_2$, ...) arranged at rough picture element intervals in the horizontal direction within a large window (W).

The method of the present invention further comprises the steps of: (a) determining a small window (S) between the two adjacent vertical lines ($L_1$, $L_2$) arranged at rough picture element intervals in such a way that upper and lower horizontal line positions are determined by adding and subtracting n-picture elements to and from the respective calculated light intensity boundary point ($CP_1$, $CP_2$) on the respective rough interval vertical lines; (b) determining fine interval vertical lines ($SL_1$, $SL_2$) within the determined small window; (c) obtaining each light intensity boundary point ($CP_{1a}$, $CP_{1b}$) on each fine interval vertical line by the same steps hereinabove described and (d) connecting the calculated light intensity boundary points obtained on the fine interval vertical lines. In addition, the method of the present invention further comprises the steps of: (a) obtaining a maximum light intensity point (M); (b) disregarding the horizontal and inclined low beam boundary lines (CL$_1$, CL$_2$) within a range determined by adding and subtracting a predetermined number (C) of picture elements to and from a point (E) D picture elements away from the obtained maximum light intensity point (M) in the horizontal direction on the screen; and (c) extending phantom horizontal and inclined boundary lines (HL$_1$, HL$_2$) from the horizontal and inclined boundary lines (CL$_1$, CL$_2$) to determine the point (E) as a connection point.

In the method according to the present invention, since the light intensity boundary points are detected along vertical lines arranged at predetermined picture element intervals along the horizontal direction on the screen, without detecting the light intensity boundary points all over the screen, to determine the cut line (the boundary line) by connecting the detected light intensity boundary points, it is possible to increase the image signal processing speed and to detect each cut line on the basis of image signal data on the screen for each optical axis regulating work of each automotive vehicle.

DETAILED DESCRIPTION OF THE PREFERRED EMBODIMENTS

Figure 3:
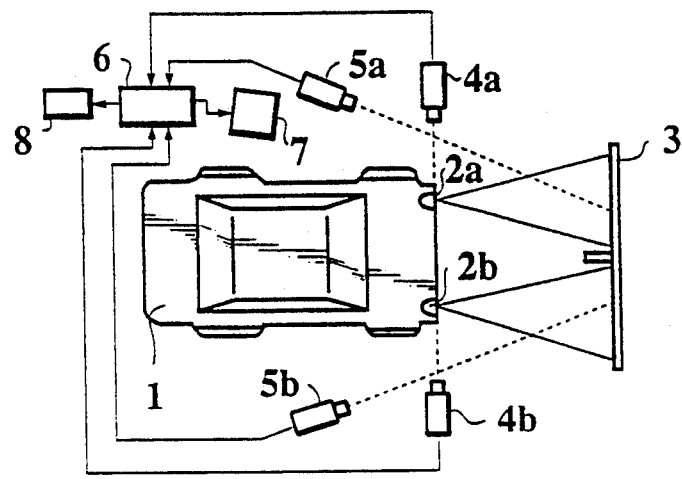
FIG. 3 is an illustration showing an optical axis regulating system to which the present invention is applied.
Figure 4:
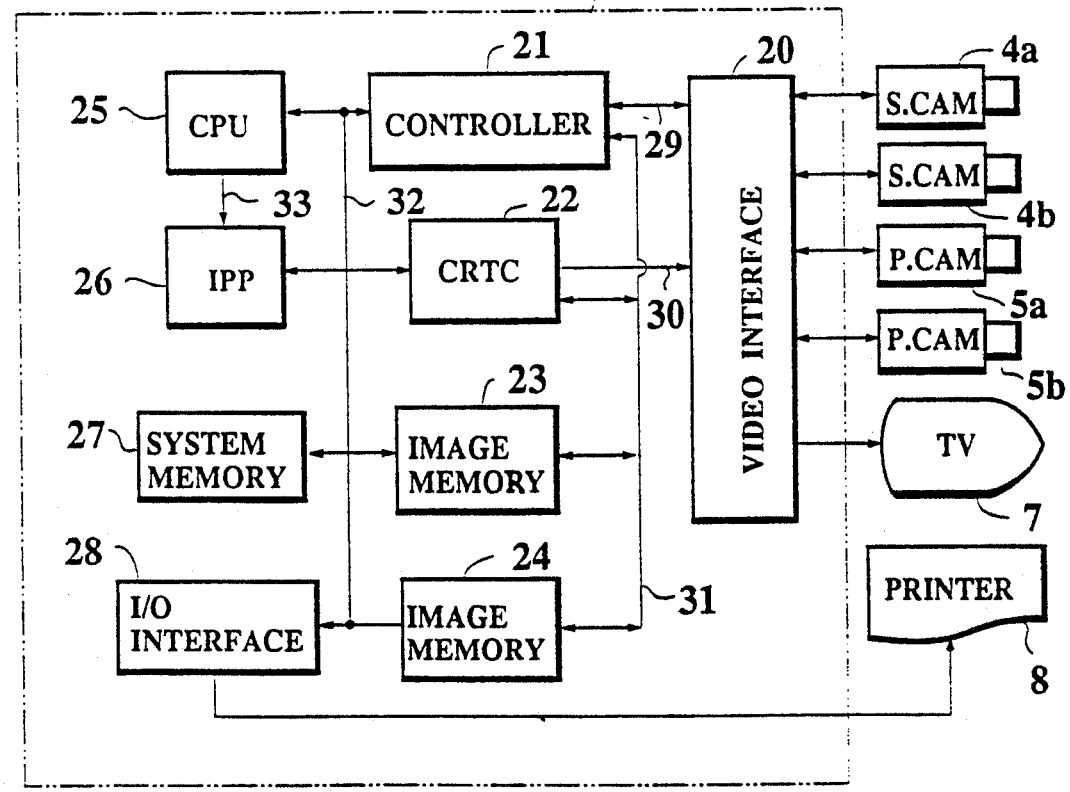
FIG. 4 is a block diagram showing an image processing unit.

FIG. 3 is an illustration showing a headlight optical axis regulating system, to which the method of the present invention is applied. The system for regulating optical axes of headlights 2a and 2b of an automotive vehicle 1 comprises a screen 3 disposed in front of the automotive vehicle 1 and irradiated with a low beam of the two headlights 2a and 2b; two side video cameras 4a and 4b for image sensing the two headlights 2a and 2b from both the sides of the vehicle; and two picture video cameras 5a and 5b disposed on both sides of the automotive vehicle 1, for image sensing a light intensity distribution pattern formed by a low beam of the two headlights 2a and 2b and projected upon the screen 3, respectively. The video signals outputted from these video cameras 4a, 4b, 5a and 5b, are selectively inputted to a video interface 20 of an image signal processing unit 6. The video interface 20 processes (e.g. amplifies, filters, clamps, etc.) these video signals, converts these analog video signals into digital video signals, and gives these digital video signals to a controller 21 via a video bus 29. The controller 21 controls the entire operation of the processing unit 6. That is, the controller 21 stores these digital video signals in two image memory units 23 and 24, respectively via a video bus 31, and transmits these digital video signals to a CPU 25 for sequential data processing and further to an IPP (image pipelined processor) 26 for parallel data processing. The image data processed by these CPU 25 and IPP 33 as described later in further detail are displayed on a monitor TV 7 via a CRTC (cathode-ray tube controller 22) and the video interface 20. On the other hand, when data are required to be printed, image data are transmitted from the image memory unit 24 to a printer 8 via an I/0 interface 28 in response to a command signal outputted from the controller 21. Further, in the above image processing unit 6, the basic data processing is executed by the CPU 25 and the IPP 26, and the priority of the data transfer operation via the video system buses 29, 30, 31, and 32 is determined by the controller 21. Further, various data and programs are stored in a system memory 27 and then transferred to the controller 21 via the image memory unit 23 where necessary.

With reference to the attached drawings, image signal processing procedure of the image processing unit 6 will be described hereinbelow.

Figure 1:
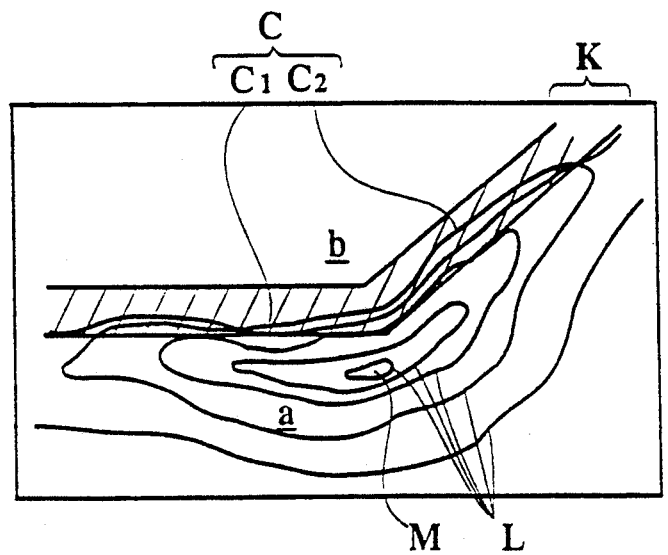
FIG. 1 is an illustration showing an example of a headlight low beam light intensity distribution pattern and a standard range in a prior-art method of regulating the optical axes of the headlights.
Figure 2:
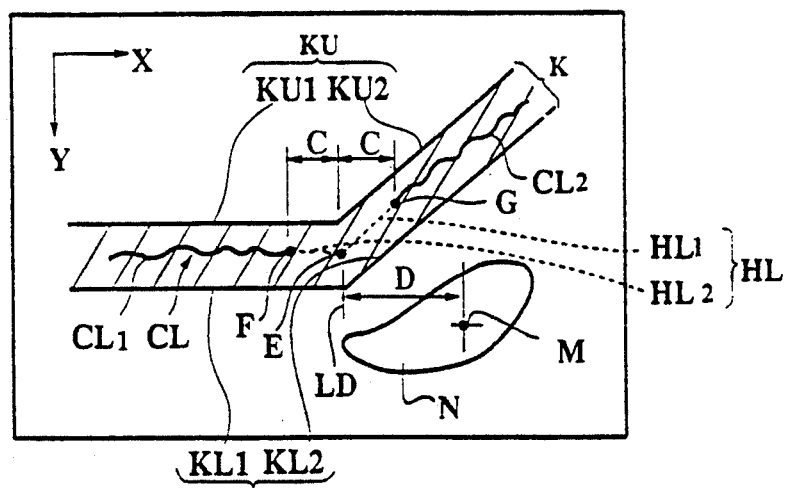
FIG. 2 is an illustration showing an example of image displayed on the monitor TV in the method of regulating optical axes of the headlights according to the present invention.

First, the image processing unit 6, under control of controller 21, hereinafter control, detects a height of the two headlights 2a and 2b on the basis of video signals outputted from the two side video cameras 4a and 4b, calculates the image position of a cut line (light intensity boundary) standard range K including an upper limit line KU and a lower limit KL according to the detected headlight height as shown in FIG. 2, and displays the calculated standard range K on the monitor TV 7. The upper limit line KU is composed of a horizontal line KU$_1$ and an inclined line KU$_2$, and the lower limit line KL is also composed of a horizontal line KL$_1$ and an inclined line KL$_2$.

Figure 5:
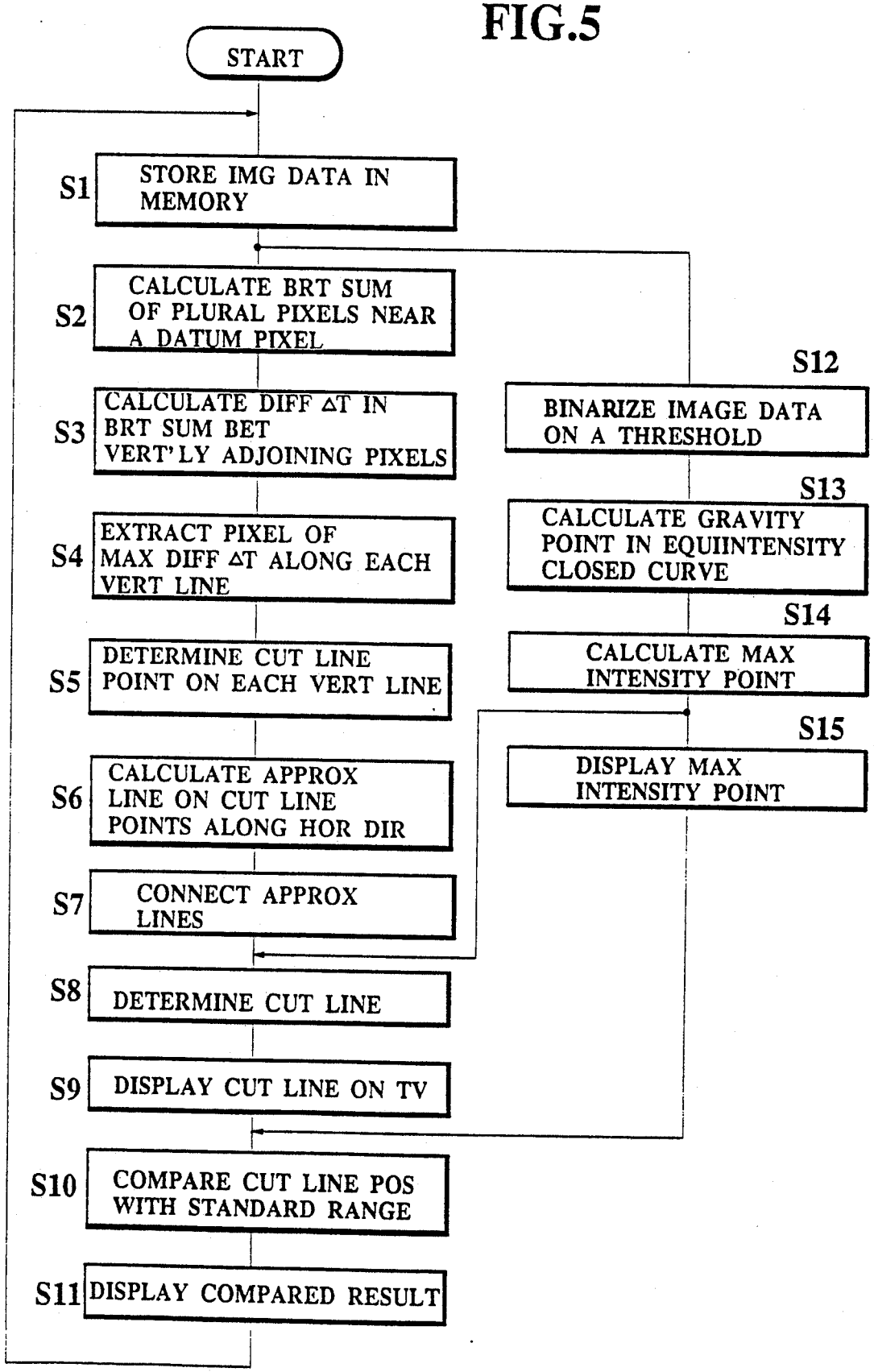
FIG. 5 is a flowchart showing an embodiment of the image processing and optical axis regulating procedure according to the present invention.
Figure 6:
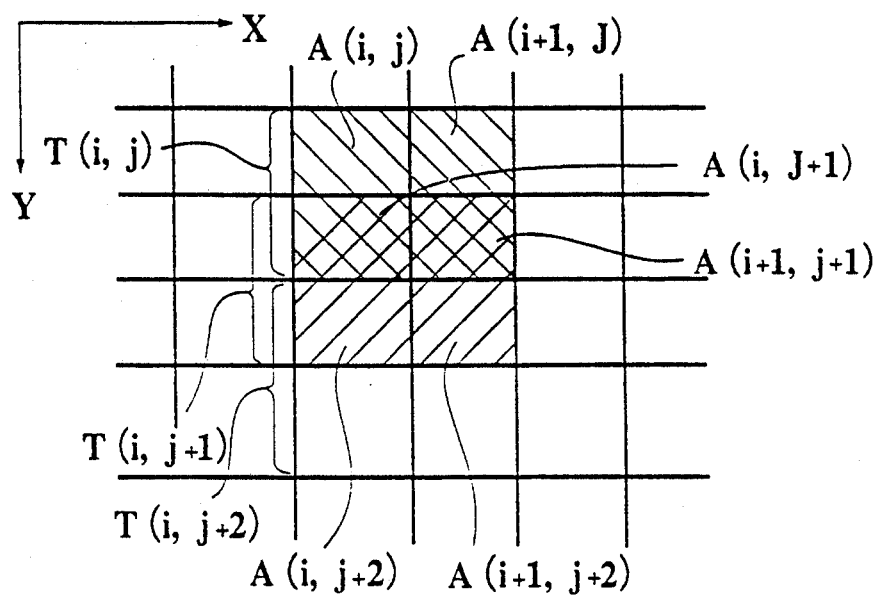
FIG. 6 is an illustration for assistance in explaining the regions near a datum pixel (picture element) on the monitor TV.
Figure 8:
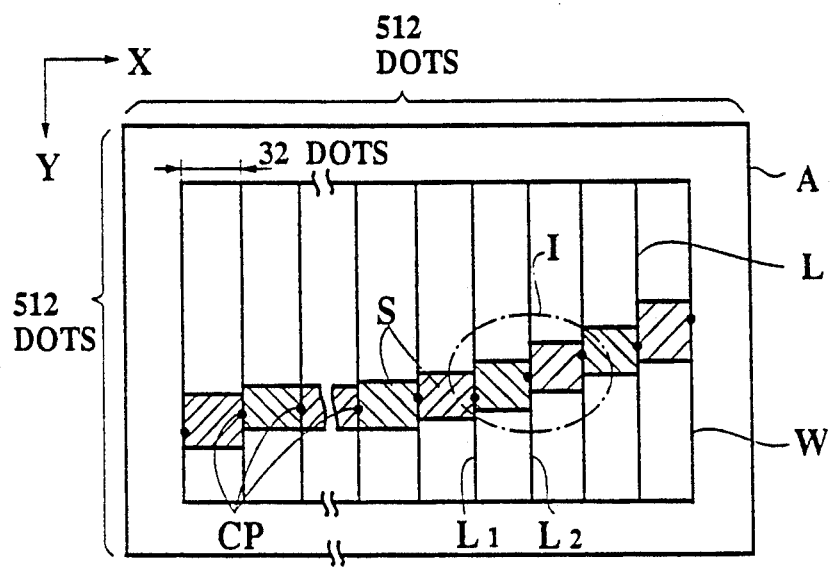
FIG. 8 is an illustration for assistance in explaining the vertical lines, the large window, and the small window.

Thereafter, control processes video signals inputted by the two video cameras 5a and 5b in accordance with the flowchart shown in FIG. 5. Image data obtained by the video cameras 5a and 5b are stored in the image memory unit 23 or 24 (in step S1). These image data on the screen 3 are composed of 512 (horizontal)×512 (vertical) picture elements (pixels), and classified in brightness (light intensity) into 256 gradations. Thereafter, control repeatedly calculates a sum total in brightness of a plurality of pixels near a datum (basic) pixel on the screen and repeatedly stores the calculated brightness sum in the system memory 27. In more detail with reference to FIG. 6, control calculates a sum total T (i, j) in brightness of a datum (basic) pixel A (i, j) and three adjoining pixels A (i, j+1), A (i+1, j+1) and A (i+1, j). Then, control repeats the above calculation by shifting the datum pixel one by one downward in the vertical direction. That is, control calculates a sum total T(i, j+1) in brightness of four pixels of A (i, j+1), A (i, j+2), A (i+1, j+2) and A (i+1, j+1). The above-mentioned operation of calculating the sum total in brightness is repeated in the vertical direction Y. In this operation, the brightness sum is not calculated all over the screen picture, but over a large window W (the minimum area required to determine a cut line (light intensity boundary line) and slightly smaller than the screen A) as shown in FIG. 8. That is, the large window W is divided into a plurality of vertical lines L with an h (e.g. 32)-dot (picture element) pitch (interval) in the horizontal direction, and the brightness sum is calculated downward along the divided vertical line L. Further, in the above description, although the brightness sum is calculated to four pixels (dots), it is of course possible to determine an appropriate number of pixels near the datum pixel under consideration of noise. In this specification, the terms dots, pixels and picture elements are used in the same or similar meaning. Further, the terms brightness, light intensity and illumination intensity are used in the same or similar meanings.

Figure 7:
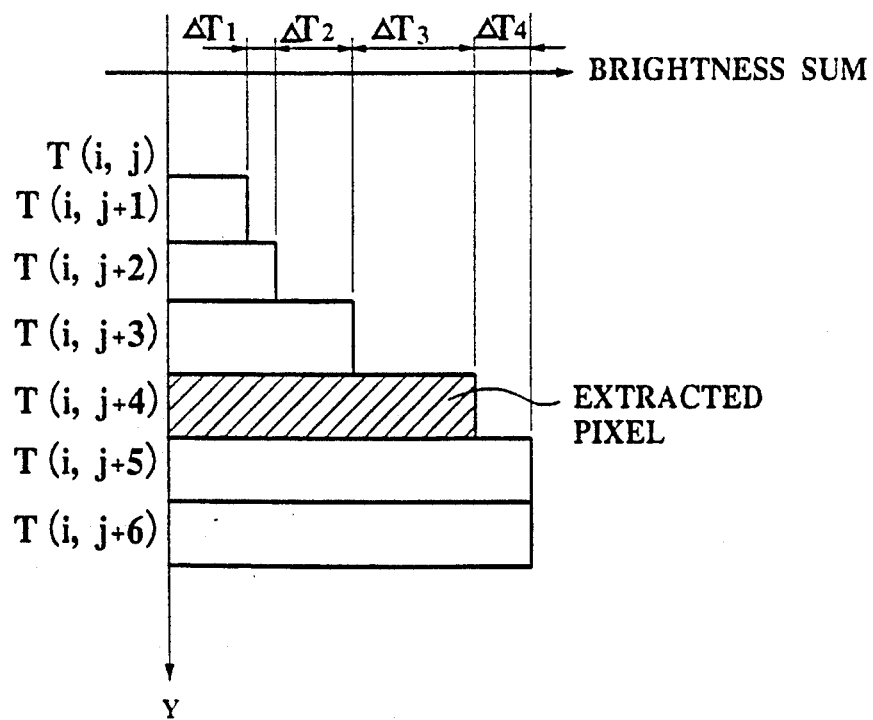
FIG. 7 is an illustration for assistance in explaining the difference T in light intensity sum along a vertical line.

Thereafter, control calculates a difference $\Delta T$ in brightness sum between two adjoining datum pixels arranged in the vertical direction Y for each vertical line L, as shown in FIG. 7 (in step S3). For instance, if the two brightness sums of two adjoining datum pixels are T (i, j+2) and T (i, j+3). the difference $\Delta T_2$ between the two is T (i, j+3) −T (i, j+2).

Then, control extracts a pixel at which the difference $\Delta T$ is the maximum (in step S4). In FIG. 7, for instance, if the maximum difference $\Delta T$ in light intensity sum total is $\Delta T_3$, a pixel having a higher brightness (light intensity) sum T (i, j+4) of the two brightness (light intensity) sums T (i, j+3) and T (i, j+4) used to obtain the difference a T3 between the two is extracted. Further, the maximum difference value (boundary point) is determined to such a level that the same cut line (boundary line) can be obtained in the same way as when the worker detects the maximum difference value by visual inspection. In general, although the maximum difference value $\Delta T$ is usually selected as the boundary point for each line L, there exist some cases where the cut line roughly equal to that determined by visual inspection can be obtained, when the difference value $\Delta T$ other than the maximum value is selected, according to the light intensity distribution pattern.

The datum pixel extracted in step S4 along the vertical line L is determined as a light intensity boundary (cut line) point CP, and plural vertical positions of the extracted datum pixels are obtained in the same way, as shown in FIG., 8 (in step S5). As described above, it is possible to determine light intensity boundary (cut line) points CP along each vertical line L on the TV picture, extending in the horizontal direction.

Figure 9:
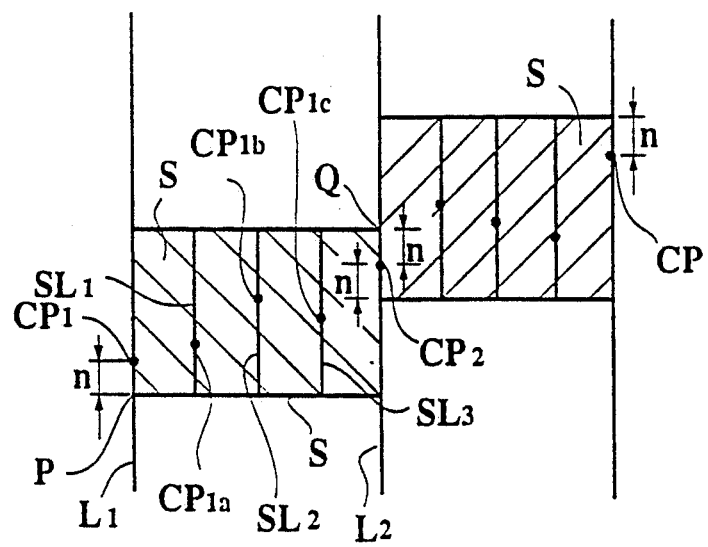
FIG. 9 is an enlarged illustration showing a dot-dashed circle I shown in FIG. 8 and for assistance in explaining how to obtain light intensity boundary points within the small window.

In the above image signal processing, plural vertical lines L are determined at predetermined (e.g. 32) dot intervals along the horizontal direction, to obtain each cut line point CP on each vertical line. Therefore, when the horizontal dot interval is decreased to increase the number of vertical lines, it is possible to obtain a great number of cut line points CP and therefore to improve the cut line point detecting precision. However, when the number of the vertical lines are increased simply, the image data processing speed drops. To overcome this problem, the pitch of the vertical lines L is determined to be 32 dots for instance within the large window W as shown in FIG. 8, and further a small window S is determined between the two vertical lines $L_1$ and $L_2$ in the large window W on the basis of the vertical positions of the cut line points $CP_1$ and $CP_2$ along the two adjacent vertical lines. Further, plural vertical lines $SL_n$ are determined at predetermined dot pitch intervals within the small window S, and cut line points $CP_n$ are calculated for each vertical lines $SL_n$ in the small window S. In determination of the small window S, the width in the vertical direction Y thereof is determined in such a way as to extend from a vertical position n-dot higher than the higher cut line point CP of the two adjacent vertical lines L to a vertical position n-dot lower than the lower cut line point CP of the two adjacent vertical lines L. For instance, with reference to FIG. 9, if the cut line point on the vertical line $L_1$ in the large window W is $CP_1$ and that on the vertical line L2 adjacent to L1 is $CP_2$, the vertical width of the small window S is determined from a vertical point P n-dots lower than the lower cut line point $CP_1$ to a vertical point Q n-dots higher than the higher cut line point $CP_2$. Further, a predetermined number of vertical lines $SL_1$, $SL_2$, and $SL_3$ are determined within the small window S, and each cut line point $CP_{1a}$, $CP_{1b}$, and $CP_{1c}$ are calculated in the same way as in the large window W.

Figure 10:
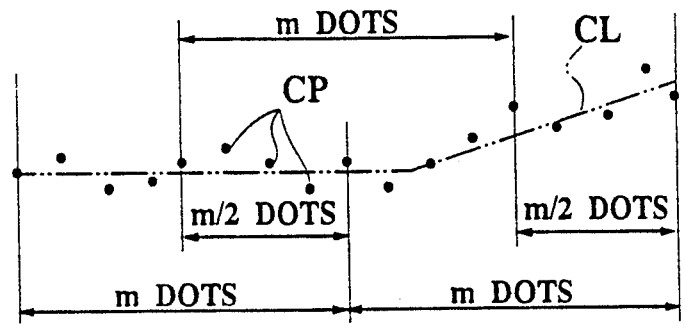
FIG. 10 is an illustration for assistance in explaining the smoothing processing of the light intensity boundary points.
Figure 11:
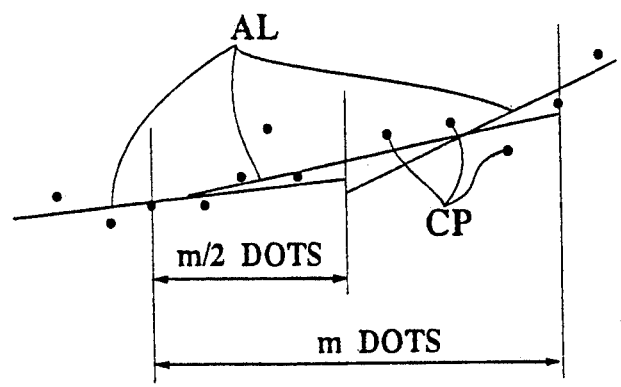
FIG. 11 is an illustration for assistance in explaining the approximate lines along light intensity boundary points.
Figure 12:
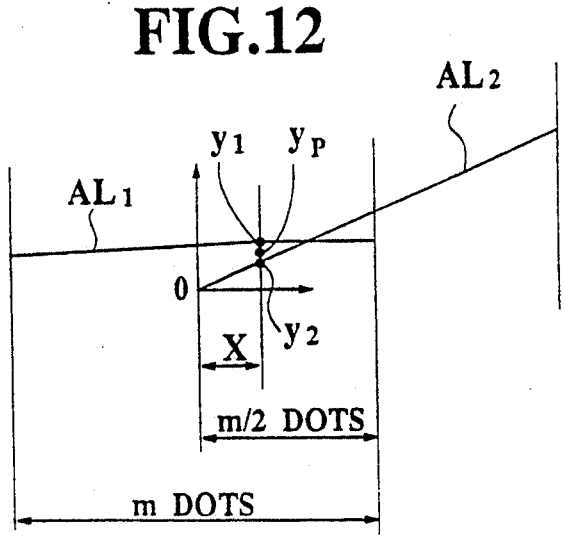
FIG. 12 is an illustration for assistance in explaining the method of obtaining a continuous line on the basis of the approximate lines.

By the above-mentioned image signal processing, a number of cut line points with a relatively small pitch can be obtained as shown in FIG. 10, since the dispersion of the calculated cut line points is relatively large, a smoothing or averaging processing is necessary. As shown in FIGS. 10 and 11, a predetermined number of dots (e.g. m dots) are collected into a group in the horizontal direction in such a way that the half (m/2 dots) are overlapped with each other, and an approximate line AL is calculated on the basis of the cut line points CP for each group in accordance with the method of least square (in step S6). However, since the calculated approximate lines AL do not form a continuously connected line, the following process is further required (in step S7). That is, as shown in FIG. 12, in the case of an approximate line $AL_1$ and another approximate line $AL_2$ overlapped with $AL_1$, if the start point of the approximate line $AL_2$ in the horizontal direction is assumed as an origin of the coordinate axis x, the ordinate $y_p$ at which the two approximate lines $AL_1$ and $AL_2$ are connected continuously can be calculated as $$y_p = \frac{(m/2 - x) y_1 + x y_2}{m/2}$$

where $y_1$ is the ordinate of the approximate line $AL_1$ at the abscissa x in a horizontal range of m/2 dots; and $y_2$ is the ordinate of the approximate line $AL_2$ at the same abscissa x.

When the above-mentioned smoothing calculation is executed for each range of m/2 dots, it is possible to obtain a cut line (light intensity boundary line) CL, as shown by a dot-dot-dashed line in FIG. 10, as a smoothed continuous line.

According to the illumination intensity distribution pattern of the headlights 2a and 2b, there exists some cases where it is difficult to detect the cut line CL near a point of intersection between the horizontal cut line $CL_1$ and the inclined cut line $CL_2$, near the maximum light intensity point M, as shown in FIG. 2. To overcome this problem, control obtains an image position of the maximum light intensity point, in parallel to the processing of the above-mentioned steps from S2 to S7, and phantom cut lines $HL_1$ and $HL_2$ are determined at the area near the maximum light intensity point M. In more detail, after control stores image data in the image memory unit 23 or 24 (in step S1), the image signals are quantitized by binarization on the basis of a predetermined threshold (in step S12). Control calculates a gravity center of the equiillumination intensity closed curve N on the basis of the binary image data (in step S13), and determines the calculated gravity center as the maximum light intensity point M (in step S14). Further, control assumes that the point E of intersection between the horizontal and oblique lines $CL_1$ and $CL_2$ is located on a vertical line D-dots shifted away in the horizontal direction (X) from the maximum light intensity point M and disregards the cut lines CL within ranges determined by adding and subtracting C-dots to and from a vertical line $L_D$ D-dots away from the point M. That is, a horizontal line HL1 is extended from the rightmost end point F of the horizontal cut line $CL_1$ to determine a point of intersection E between the horizontal line $HL_1$ and the vertical line $L_D$. Finally, the inclined line $HL_2$ is obtained by extending the leftmost end point G of the inclined cut line $CL_2$ to the point E, so that a phantom cut line HL can be obtained as shown in FIG. 2.

On the basis of the above-mentioned image data processing, cut line positions are determined along each vertical line (in step S8), and control displays the above-mentioned cut line standard range K and the obtained cut line HL on the monitor TV as shown in FIG. 2 (in step S9). Further, the maximum light intensity point M is indicated by + mark on the monitor TV 7 on the basis of the point obtained in step S14, as depicted in FIG. 2 (in step S15).

Thereafter, the worker compares the cut line CL of the headlights thus obtained with the cut line standard range K in position to check whether the low beam position is acceptable or not (in step S10), and displays the check results on the monitor TV 7 (in step S11).

In practice, the optical axis regulating work of the headlight is made in such a way that the cut line CL is located within the cut line standard range K when the worker turns an adjust screws while watching the monitor TV 7 or when an optical axis regulating robot turns the adjust screws in feedback control operation in response to the video signals processed as described above.

As described above, in the present invention, since the cut line (light intensity boundary line) can be detected at high speed on the basis of the light intensity distribution pattern projected on the screen 3 and in accordance with video signal processing operation, by detecting each cut line CL for each vehicle test, it is possible to accurately perform the optical axis regulating work of the headlights 2a and 2b.

As described above, in the method of regulating optical axes of the headlights, since the light intensity boundary points along a plurality of the vertical lines can be detected at predetermined pixel intervals in the horizontal direction on the basis of updated video images, and further the boundary line can be determined by connecting the respective light intensity boundary points, it is possible to improve the image processing speed and the reliability of the optical axis regulating work.

What is claimed is:

1. A method of regulating optical axes of headlights for an automotive vehicle so that a light intensity boundary of headlight low beam lies within a predetermined range, comprising the steps of:
   (a) projecting the headlight low beam on the screen;
   (b) detecting headlight intensity on the screen;
   (c) calculating a sum total in detected light intensity of a datum picture element and some adjoining picture elements;
   (d) repeatedly calculating the sum totals in detected light intensity along a vertical line;
   (e) calculating a difference in light intensity sum total between two adjoining datum picture elements along the vertical line;
   (f) extracting the two adjoining datum picture elements between which the calculated difference in light intensity sum total is roughly the maximum;
   (g) determining as a light intensity boundary point (CP) a datum picture element having the higher light intensity sum total of the two extracted adjoining datum picture elements between which the calculated difference in light intensity sum total is roughly the maximum;
   (h) repeating the above steps from (b) to (g) along other vertical lines arranged at predetermined picture element intervals along horizontal direction; and
   (i) connecting the calculated light intensity boundary points to determine the light intensity boundary line.

2. The method of claim 1, wherein the calculated light intensity boundary line is composed of a horizontal low beam boundary line and an inclined low beam boundary line connected to the horizontal boundary line.

3. The method of claim 2, wherein the sum total in light intensity is repeatedly calculated along each of a plurality of vertical lines arranged at rough picture element intervals in the horizontal direction within a large window.

4. The method of claim 3, which further comprises the steps of:
   (a) determining a small window between the two adjacent vertical lines arranged at rough picture element intervals in such a way that upper and lower horizontal line positions are determined by adding and subtracting n-picture elements to and from the respective calculated light intensity boundary point on the respective rough interval vertical lines;
   (b) determining fine interval vertical lines within the determined small window;
   (c) obtaining each light intensity boundary point on each fine interval vertical line by the same steps as in claim 1; and
   (d) connecting the calculated light intensity boundary points obtained on the fine interval vertical lines.

5. The method of claim 4, which further comprises the steps of:
   (a) dividing the fine interval vertical lines into plural groups so that a predetermined number of picture elements are overlapped with each other;
   (b) obtaining each approximate line for each divided group in accordance with least-square method for smoothing processing;

(c) calculating a connection-on point between the horizontal and inclined boundary lines on the basis of two adjacent approximate lines in accordance with the following equation:

$$y_p = \frac{(m/2 - x)y_1 + xy_2}{m/2}$$

where m/2 denotes the number of overlapped picture elements; $y_1$ is the ordinate of the first approximate line at abscissa x in a horizontal range of m/2 picture elements; $y_2$ is the ordinate of the second approximate line at the same abscissa x; and $y_p$ denotes an ordinate position of the connection point, under the condition that a start point of the second approximate line along the horizontal direction is an origin of coordinate axis x.

6. The method of claim 2, which further comprises the steps of:
    (a) obtaining a maximum light intensity point;
    (b) disregarding the horizontal and inclined low beam boundary lines within a range determined by adding and subtracting a predetermined number of picture elements to and from a point D picture elements away from the obtained maximum light intensity point in the horizontal direction on the screen; and
    (c) extending phantom horizontal and inclined boundary lines from the horizontal and inclined boundary lines to determine the point as a connection point.

* * * * *